United States Patent
Alphonso et al.

(10) Patent No.: US 12,300,217 B2
(45) Date of Patent: May 13, 2025

(54) ERROR CORRECTION IN SPEECH RECOGNITION

(71) Applicant: Microsoft Technology Licensing, LLC, Redmond, WA (US)

(72) Inventors: Issac John Alphonso, San Jose, CA (US); Anastasios Anastasakos, San Jose, CA (US); Michael Levit, San Jose, CA (US); Nitin Agarwal, Fremont, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 372 days.

(21) Appl. No.: 17/342,505

(22) Filed: Jun. 8, 2021

(65) Prior Publication Data

US 2022/0392432 A1    Dec. 8, 2022

(51) Int. Cl.
| | |
|---|---|
| *G10L 15/01* | (2013.01) |
| *G06N 3/08* | (2023.01) |
| *G10L 15/06* | (2013.01) |
| *G10L 15/183* | (2013.01) |
| *G10L 15/22* | (2006.01) |

(52) U.S. Cl.
CPC ............... *G10L 15/01* (2013.01); *G06N 3/08* (2013.01); *G10L 15/063* (2013.01); *G10L 15/183* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 8,862,467 B1 | 10/2014 | Casado et al. | |
| 9,589,562 B2 | 3/2017 | Kibre et al. | |
| 10,089,981 B1* | 10/2018 | Elangovan | G10L 15/22 |
| 10,672,394 B2 | 6/2020 | Lebeau et al. | |
| 2009/0055179 A1* | 2/2009 | Cho | G10L 15/193 |
| | | | 704/E15.003 |

(Continued)

FOREIGN PATENT DOCUMENTS

WO    2014093384 A1    6/2014

OTHER PUBLICATIONS

Shivakumar et al. (2019). Learning from past mistakes: Improving automatic speech recognition output via noisy-clean phrase context modeling. APSIPA Transactions on Signal and Information Processing, 8, E8. doi:10.1017/ATSIP.2018.31 (Year: 2019).*

(Continued)

*Primary Examiner* — Pierre Louis Desir
*Assistant Examiner* — Keisha Y. Castillo-Torres
(74) *Attorney, Agent, or Firm* — Foley IP Law, PLLC (57) ABSTRACT

Systems and methods for speech recognition correction include receiving a voice recognition input from an individual user and using a trained error correction model to add a new alternative result to a results list based on the received voice input processed by a voice recognition system. The error correction model is trained using contextual information corresponding to the individual user. The contextual information comprises a plurality of historical user correction logs, a plurality of personal class definitions, and an application context. A re-ranker re-ranks the results list with the new alternative result and a top result from the re-ranked results list is output.

20 Claims, 8 Drawing Sheets

(56) References Cited

U.S. PATENT DOCUMENTS

| | | | | |
|---|---|---|---|---|
| 2015/0149163 | A1 | 5/2015 | Vanblon et al. | |
| 2015/0243278 | A1* | 8/2015 | Kibre | G10L 15/187 704/243 |
| 2015/0279354 | A1* | 10/2015 | Gruenstein | G10L 15/22 704/235 |
| 2018/0330714 | A1* | 11/2018 | Paulik | G10L 15/19 |
| 2019/0355011 | A1* | 11/2019 | Pustejovsky | G06N 20/00 |
| 2020/0226216 | A1* | 7/2020 | Marin | G06F 40/30 |
| 2020/0380963 | A1 | 12/2020 | Chappidi et al. | |
| 2023/0153061 | A1* | 5/2023 | Elyada | G06F 3/167 715/727 |

OTHER PUBLICATIONS

Jeong, et al., "Improving Speech Recognition and Understanding using Error-Corrective Reranking", In Proceedings of ACM Transactions on Asian Language Information Processing, vol. 7, Issue 1, Feb. 8, 2008, 26 Pages.

"International Search Report and Written Opinion Issued in PCT Application No. PCT/US22/028251", Mailed Date: Sep. 2, 2022, 10 Pages.

Shivakumar, et al., "Learning from Past Mistakes: Improving Automatic Speech Recognition Output via Noisy-Clean Phrase Context Modeling", In Repository of arXiv:1802.02607v1, Feb. 7, 2018, pp. 1-22.

Aleksic, et al., "Bringing Contextual Information to Google Speech Recognition", In Proceedings of 16th Annual Conference of the International Speech Communication Association, Sep. 6, 2015, 5 Pages.

Baba, et al., "How are Spelling Errors Generated and Corrected? A Study of Corrected and Uncorrected Spelling Errors Using Keystroke Logs", In Proceedings of the 50th Annual Meeting of the Association for Computational Linguistics, vol. 2, Jul. 8, 2012, pp. 373-377.

Kumar, et al., "Leveraging Linguistic Context in Dyadic Interactions to Improve Automatic Speech Recognition for Children", In Journal of Computer Speech & Language, vol. 63, Sep. 1, 2020, 18 Pages.

Lu, et al., "Speech Enhancement Guided by Contextual Articulatory Information", In Repository of arXiv:2011.07442v1, Nov. 15, 2020, 5 Pages.

Raju, Anirudh, "Contextual Clues Can Help Improve Alexa's Speech Recognizers", Retrieved from: https://www.amazon.science/blog/contextual-clues-can-help-improve-alexas-speech-recognizers, Jul. 23, 2018, 13 Pages.

\* cited by examiner

| Transcription | N-Best | Edits | Is Personalized Contact |
|---|---|---|---|
| tell Eric I am running late | tell Erik am running late | 2 | FALSE |
| | tell Eric am running late | 1 | TRUE |
| | tell Eric im running late | 2 | TRUE |
| | telerik i'm running late | 4 | FALSE |

FIG. 7

ERROR CORRECTION IN SPEECH RECOGNITION

BACKGROUND

Computer speech recognition (CSR) systems are being used in an increasing number of different applications and environments. As the use of these systems increases, rapid and accurate recognition of human speech is desirable to increase the useability and effectiveness of the systems. Conventional CSR systems recognize words by comparing a spoken utterance to a static model of each word in a vocabulary. The word whose model best matches the utterance is recognized as the spoken word. A CSR system may model each word as a sequence of phonemes that compose the word. To recognize an utterance, the CSR system identifies a word sequence, the phonemes of which best match the utterance. These phonemes may, however, not exactly correspond to the phonemes that compose a word. Thus, CSR systems typically use a probability analysis to determine which word most closely corresponds to the identified phonemes.

The difficulty in finding an exact correspondence between a spoken utterance and a model of a word is due to the great variation in speech that is not completely and accurately captured by the static word models. These variations result from, for example, the accent of the speaker, the speed and pitch at which a person speaks, the current health (e.g., with a cold) of the speaker, the age and sex of the speaker, etc. CSR systems that use probabilistic techniques can more accurately recognize speech than techniques that seek an exact correspondence, but errors in the speech recognition still result. That is, while the CSR systems can be trained, for example by presenting a large variety of pre-selected words to a speaker, the process is time consuming and still is not entirely accurate in recognizing all words thereafter spoken.

Thus, CSR systems require accurate pronunciations of words, wherein language models used by general CSR systems that convert spoken audio into text are trained using standard or common pronunciations. However, the general language models may not have appropriate pronunciations for some words, resulting in inaccurate conversion of the spoken audio.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for speech recognition correction comprises receiving a voice recognition input from an individual user and using a trained error correction model to add a new alternative result to a results list based on the received voice input processed by a voice recognition system. The error correction model is trained using contextual information corresponding to the individual user. The contextual information comprises a plurality of historical user correction logs, a plurality of personal class definitions, and an application context. The computerized method further comprises using a re-ranker to re-rank the results list with the new alternative result and outputting a top result from the re-ranked results list.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods of various examples described herein are configured to provide error correction to speech recognition performed by CSR systems. In one or more examples, personalized error correction is performed on recognized speech processed by the CSR system. For example, error correction is performed that learns to correct recognition errors based on contextual information corresponding to a particular user. In some examples, the contextual information includes historical data, personal class definitions, and an application context. That is, error correction is performed in some examples based on the intersection between historical data (e.g., historical user correction logs), personal class definitions (e.g., personal contact lists), and application context (e.g., personal or business application). As a result, speech recognition accuracy is improved in some examples by leveraging the contextual information, which improves the overall user experience. In this manner, when a processor is programmed to perform the operations described herein, the processor is used in an unconventional way that allows for more efficient and reliable speech recognition, which results in an improved user experience.

In various examples, an error correction model allows for improved ranking of a results list based on a received voice input processed by a CSR system, which includes adding new alternatives to the results list. That is, first-pass recognition by the CSR system is improved by one or more examples of the present disclosure by using ranking or re-scoring algorithms that add contextual information to the correction process in a second-pass approach (e.g., processing after the speech recognition processing in a first-pass operation). For example, a second-pass recognition adds new candidates to options for the recognized speech output (e.g., convert spoken words to text) by taking an existing lattice or N-best list, and using (e.g., enriching or enhancing the lattice or N-best list with) at least personal information of the user to identify new candidates (e.g., hypothesis) or select a candidate from the N-best list that was previously given less consideration or weight. In various examples, the error correction second-pass is not forced to remain in a restricted space of the traditional second-pass approach.

Figure 1:
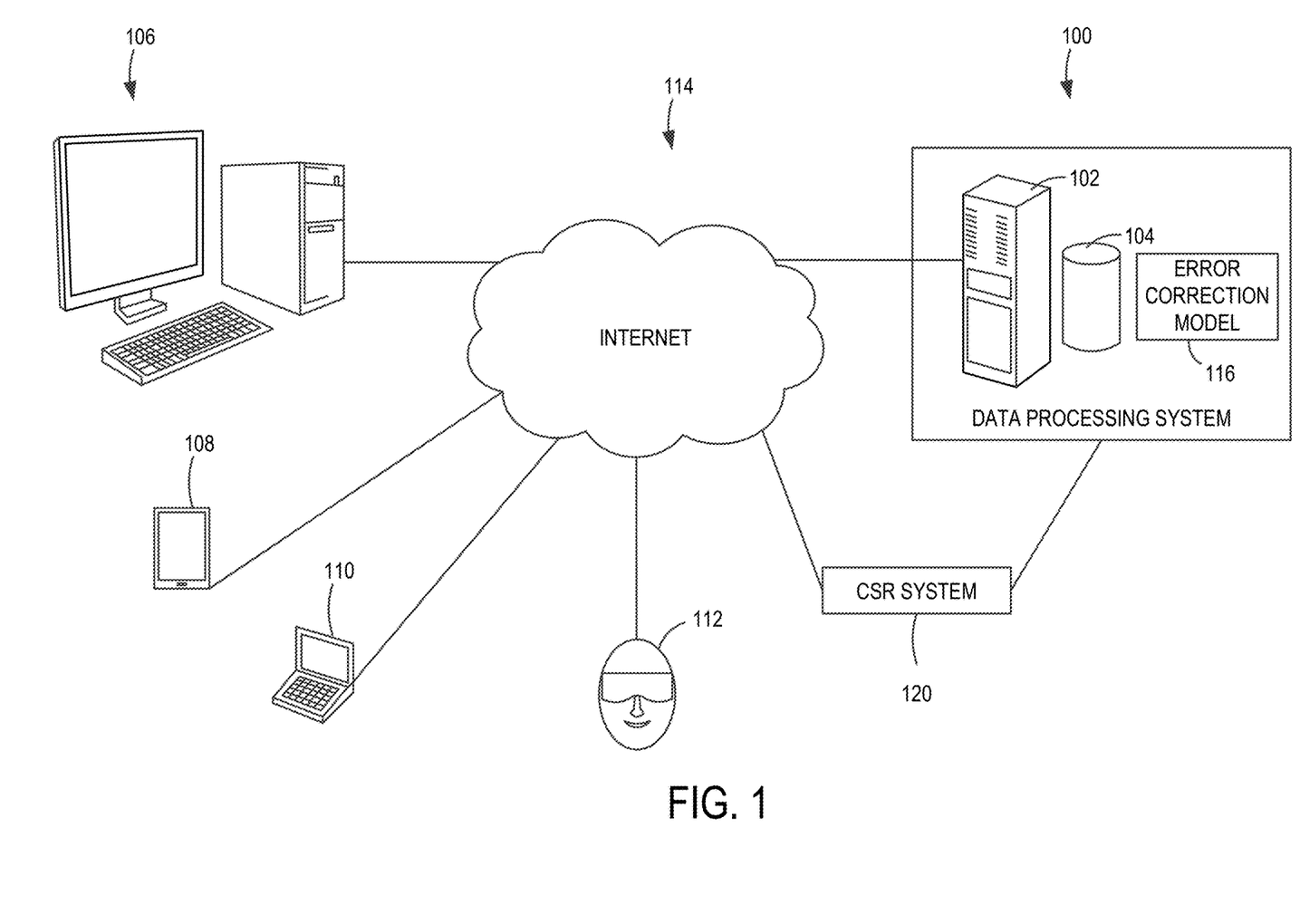
FIG. 1 is a block diagram illustrating a system according to an example.

The processes described herein are not limited to a particular type of speech recognition or detection but can be implemented with different types of speech recognition tasks in different applications. The speech recognition correction can be implemented in a data processing system 100 (e.g., speech processing system) deployed as a cloud service as illustrated in FIG. 1. In this example, the data processing system 100 implements the speech recognition error correction processes described herein to allow for efficient and accurate speech recognition using an error correction model. That is, the data processing system 100 operates using an error correction model in a second-pass process that performs personalized correction of speech recognition for an individual user.

The data processing system 100 includes one or more computers 102 and storage 104 to store, for example, recognized words and personal information for the user useful to provide context for the error correction of the recognized words. It should be appreciated that other data can be stored in the storage 104 and processed by the one or more computers 102 using various examples of the present disclosure.

The data processing system 100 is connected to one or more end user computing devices in some examples, such as a desktop computer 106, a smart phone 108, a laptop computer 110, and an augmented reality head worn computer 112 (e.g., Microsoft HoloLens®), each of which are capable of receiving spoken words or utterances from the user. In the illustrated examples, the data processing system 100 is shown as connected to the end user computing devices via a computer network 114, illustrated as the Internet.

The data processing system 100 receives input data, such as spoken words from an end user computing device or server, or a speech recognition output (e.g., converted speech) from a CSR system 120. The data is uploaded to the data processing system 100 for processing, such as for error correction processing that modifies a results list based on the received voice input, such as processed by the CSR system 120. It should be noted that in some examples, the data processing system 100 performs first-pass CSR processing. It should also be appreciated that some or all of the data processing system 100 or the functionality of the data processing system 100 can be implemented within one or more of the end user computing devices.

The data processing system 100 in this example implements an error correction model 116 that is trained and performs error correction on the output of the CSR to result in more efficient and accurate speech recognition and conversion to text. For example, the error correction model 116 learns to correct recognition errors based on personalized user contextual information as described in more detail herein. In some examples, the functionality of the data processing system 100 described herein is performed, at least in part, by one or more hardware logic components. For example, and without limitation, illustrative types of hardware logic components that are used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
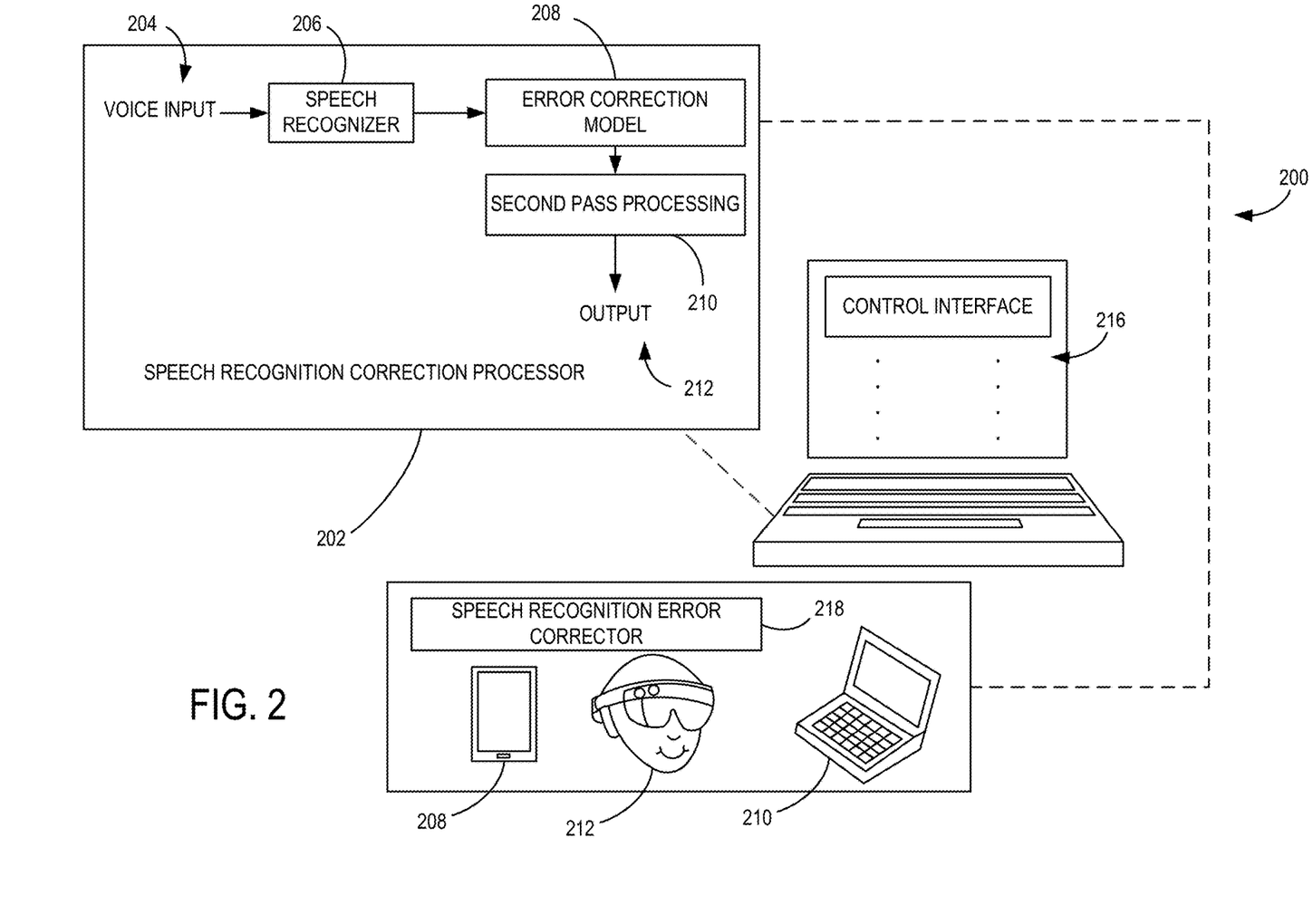
FIG. 2 is a block diagram illustrating a speech recognition correction system according to an example.

Thus, with the present disclosure, improved speech recognition is performed, such as using a speech recognition correction system 200 as illustrated in FIG. 2. The speech recognition correction system 200 in one example uses an error correction model 208 in second-pass processing 210 to generate an output 212, which in one example is converted speech from a voice input 204 that is error corrected. More particularly, the speech recognition system 200 includes a speech recognition correction processor 202 that is configured in some examples as a processing engine that performs correction of errors in speech recognition of the voice input 204 by a speech recognizer 206. That is, the speech recognition correction processor 202 improves first-pass processing of the voice input 204 by the speech recognizer 206 using personalized error correction techniques described in more detail herein. It should be noted that the first-pass speech recognition performed by the speech recognizer 206 can be performed using any CSR process. Additionally, in some examples, the CSR process is performed by one or more processors before being received by the speech recognition correction processor 202. That is, the speech recognizer 206 in some examples is external to the speech recognition correction processor 202, such that in these examples, the speech recognition correction processor 202 receives a speech recognized output based on the voice input 204.

The speech recognition correction processor 202 in various examples is configured as a learning system that dynamically learns new corrections for misrecognized words assisted by implicit or explicit user-supplied corrections or other user contextual information. The speech recognition correction processor 202 performs the second-pass processing 210 using the error correction model 208 to dynamically improve speech recognition in various examples. In one usage scenario, a user interacts with a speech-enabled application running on a client device. The speech-enabled application and the client device provide the user interface (i.e., frontend) of the speech recognition system. In one example, the client device includes a processor for running applications (e.g., an operating system and the speech-enabled application), a memory for storing applications and data, an audio input transducer (e.g., a microphone) for receiving voice inputs, and a video display (e.g., a screen) for sharing visual information.

The client device may optionally include a keyboard or keypad (physical or virtualized), a touch screen, and/or other input mechanisms, and may optionally include an audio output transducer (e.g., a speaker) and/or other output mechanisms. The speech-enabled application may be a multi-modal application that accepts other types of inputs in addition to voice inputs.

Examples of suitable client devices include, but are not limited to, laptop computers 110, desktop computers 106, mobile phones, personal digital assistants, smartphones 108, smartwatches, video game systems, smart appliances (e.g., smart televisions), navigation systems, and automotive entertainment systems (e.g., car radios), among other devices. It should be appreciated that the client device may combine multiple component devices to provide the operating functionality.

Figure 3A:
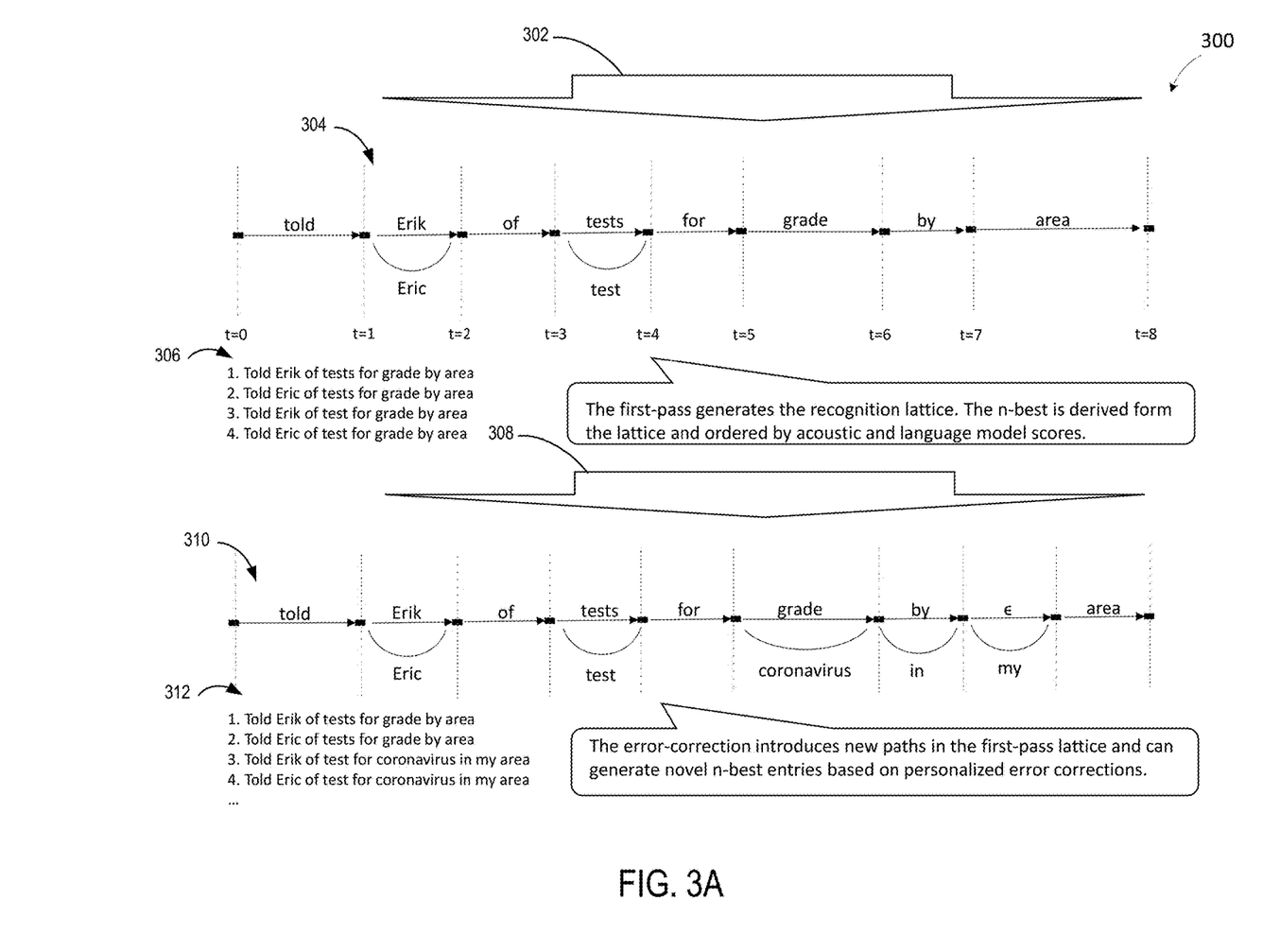
FIGS. 3A and 3B illustrate a speech recognition correction process according to an example.
Figure 3B:
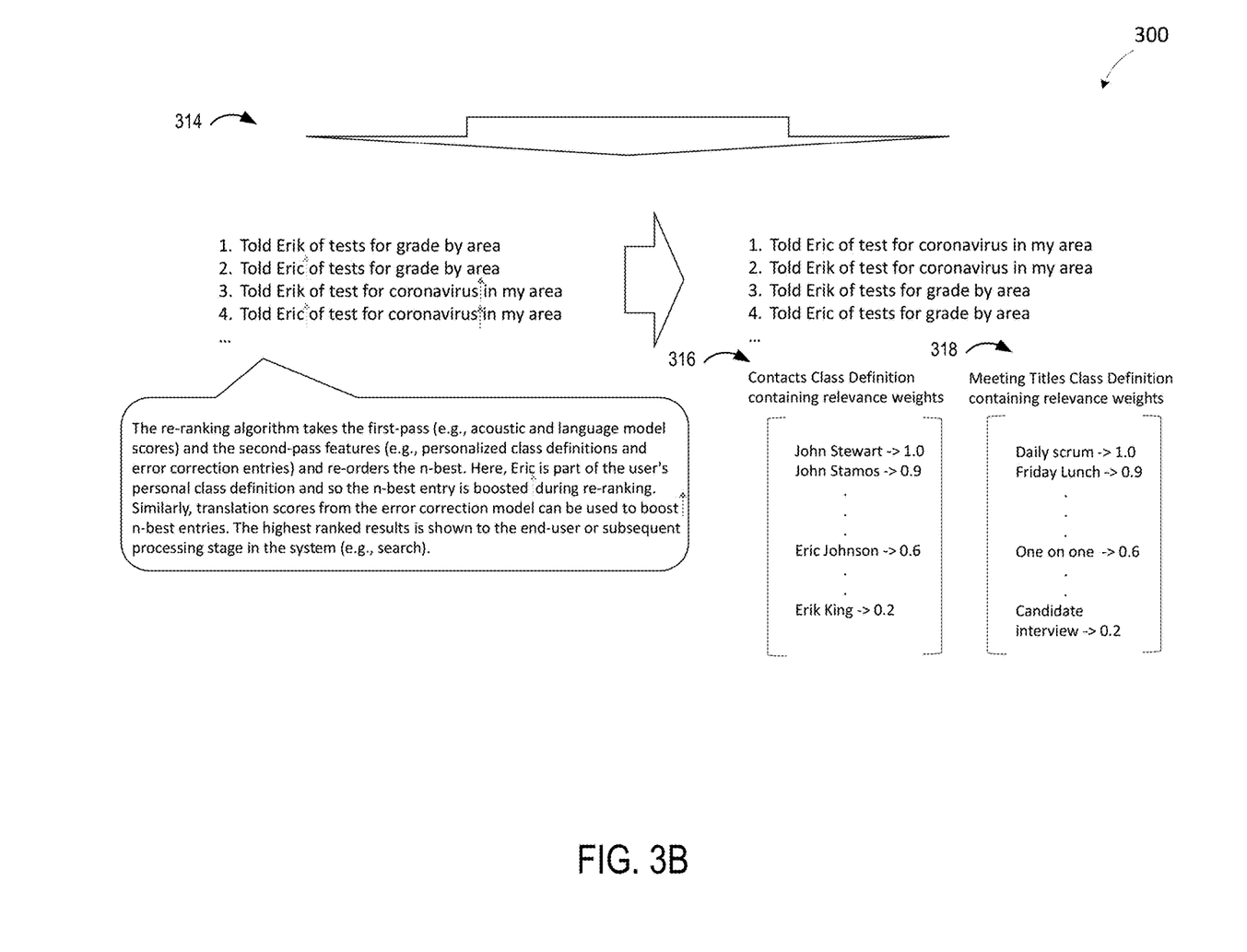

With reference now to FIGS. 3A and 3B, a speech recognition correction process 300, such as performed by the second-pass processing 210 using the error correction model 208 is shown. In this process 300, the user begins a recognition event by speaking (e.g., a spoken utterance 302) to the speech-enabled application. In one example, the audio data (e.g., an audio file or stream) of the spoken utterance is transmitted to a real-time (e.g., online) speech recognition system (e.g., the speech recognizer 206) that performs first-pass processing 304 on the spoken utterance 302 to translate or convert (e.g., recognizes or decodes) the speech into text. In one example, the real-time speech recognition system runs on a remote computing device. In other examples, the speech recognition system runs on the client device (e.g., one or more of the end computing devices illustrated in FIG. 1) that processes the spoken utterance locally.

The real-time speech recognition system decodes the audio data and returns decoded text to the speech-enabled application. The initial accuracy of the speech recognition is dependent on a variety of factors, such as the language model used by the real-time speech recognition system and the quality of the audio. If the real-time speech recognition system fails to properly recognize one or more words from the spoken utterance, the user does not receive the desired result from the speech-enabled application. As a result, the user resorts to making a subsequent corrective input. The corrective input may be supplied using another type of input, such as, but not limited to, voice (e.g., the user repeats what the user previously said in exactly the same way or with a slight modification), typing, touch gestures, and menu navigation. The user may also attempt to alternate voice input techniques, such as speaking the letters to spell an incorrectly recognized word. After making the corrective input, the user receives an appropriate response from the speech-enabled application. In some examples, an error corrected response is provided in response to a second-pass error correction operation as described in more detail herein.

In the illustrated example, the first-pass processing generates a recognition lattice or probability lattice. For example, to determine the probability that a sequence of words in the utterance represents a phoneme, the CSR system generates the lattice. The lattice of a phoneme represents a calculation of the probabilities for each possible state path for the sequence of words (e.g., codewords). The lattice contains a node for each possible state the speech recognizer 206 can be in for each word in the sequence. In one example, each node contains the accumulated probability that the words processed so far will result in the speech recognizer 206, using for example a hidden Markov model (HMM) for each word in the vocabulary, being in the state associated with that node. The sum of the probabilities in the nodes for a particular word indicates the likelihood that the words processed so far represent a prefix portion of the phoneme.

In one example, the N-best list of candidate speech recognitions for the spoken utterance 302 is derived from the lattice. In some examples, the N-best candidates are ordered by acoustic and language model scores using speech recognition techniques. As can be seen in FIG. 3, over a time period t=0 to t=8, a list 306 of N-best candidates is generated for the eight spoken words. Personalized error correction 308 is then performed using contextual information corresponding to the user.

For example, as described in more detail herein, contextual information corresponding to an individual user, such as a plurality of historical user correction logs, a plurality of personal class definitions, and an application context are used in the second-pass processing 310. In one example, error correction introduces new paths in the first-pass lattice resulting from the first-pass processing 304, which is used to generate a new list 312 of N-best candidates for the eight spoken words. In some examples, the candidates in the new list 312 include updated candidates (e.g., revised candidates) and/or new candidates (e.g., candidates 3 and 4 in the list 312) not present in the list 306. That is, the new list 312 includes novel N-best entries or candidates based on personalized error correction as described in more detail herein.

The new list 312 is then re-ranked using re-ranking processing 314. That is, the new list 312 is re-ranked to generate a new N-best list of candidates, which includes any newly added candidates. As can be seen in FIG. 3B, the candidates have been reordered into a new rank order. In one example, a re-ranking algorithm takes the first-pass results (e.g., acoustic and language model scores) and at least one of the second-pass features (e.g., personalized class definitions and error correction entries) and re-orders the N-best candidates. That is, in various examples, the re-ranking processing 314 results in a new results list after performing the second-pass processing, wherein the second-pass processing includes additional features not considered in the first-pass processing. FIG. 3B illustrates different definitions 316 and 318 based on different weights. The definition 316 is a contacts class definition containing relevance weights and the definition 318 is a meeting titles class definition containing relevance weights. As can be seen, the different personalized contextual information affects the weighting of the results, and can be selected, for example, by the user. In some examples, one or more, or a combination of definitions and relevant weights are used.

As can also be seen in the illustrated example, Eric is part of the user's personal class definition and so the N-best entry is "boosted" during re-ranking (i.e., the ranking of the entry in increased in the list). Similarly, translation scores from the error correction model are used in some examples to "boost" N-best entries or lattice paths. The highest ranked results are shown to the end user or passed to a subsequent processing stage in the system (e.g., to perform a search) in some examples.

In some examples, the supervised ranker is trained in an offline training process that uses the herein described features (e.g., translation score, personal class definitions, etc.). The training process is performed in various examples using any supervised machine learning model. The ranker model is then used or served online in the second-pass as described in more detail herein. As a result, online processing can use personal class definitions (or other personal information) to pick the best option from the N-best list as described herein.

Figure 4:
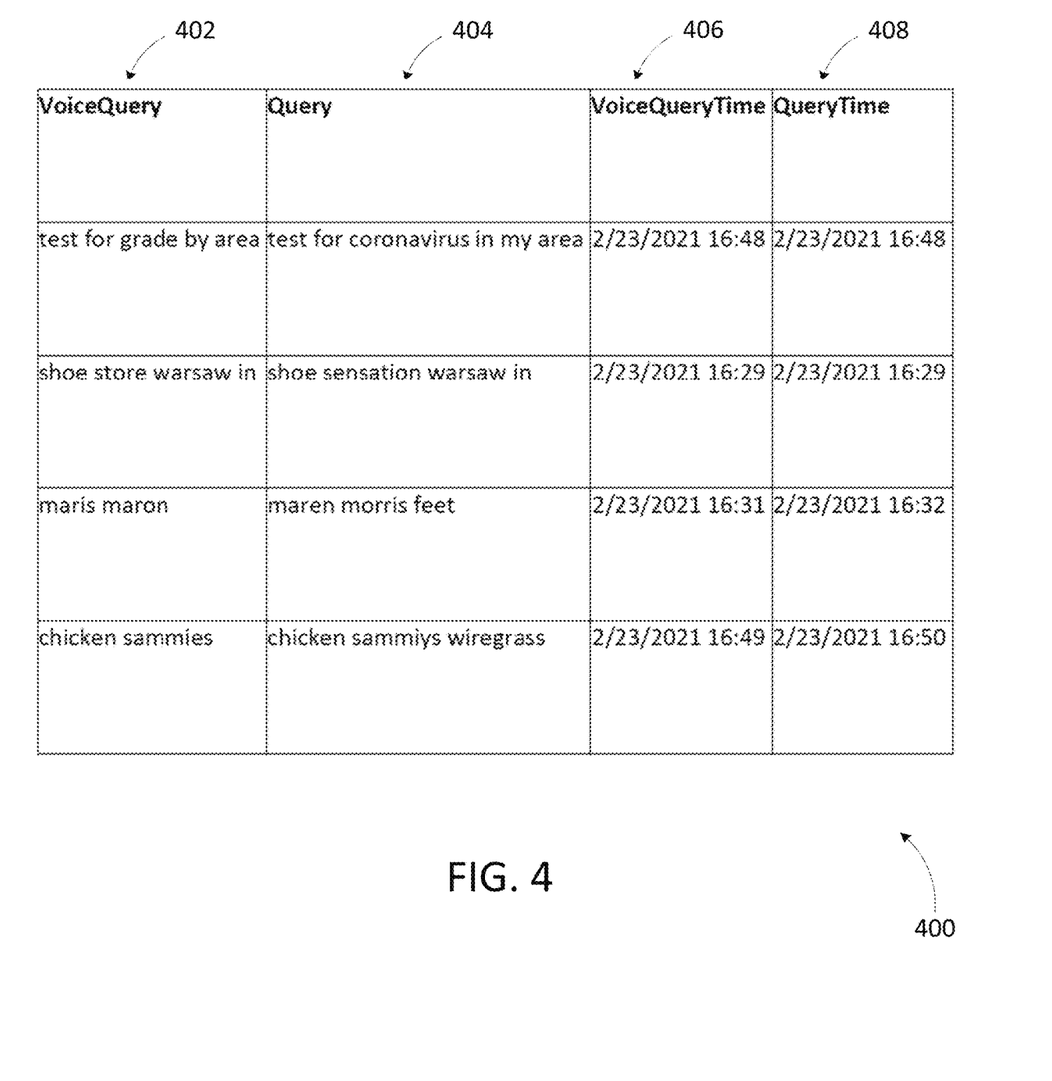
FIG. 4 is a table of error correction logs according to an example.

During the initial exchange related to the first-pass processing 304, recognition event data is generated and recorded (e.g., logged) in some examples. For example, FIG. 4 illustrates a table 400 used in various examples of error correction techniques described herein to correct recognition errors. The table 400 corresponds to user correction logs having personalized correction data relating to voice queries 402 of the user. In this example, in addition to the voice queries 402, the typed or corrected text queries 404, the voice query time 406, and the translated text query time 408 are logged. In various examples, the error correction logs in the table 400 illustrate log entries where text queries are used to implicitly confirm or reject recognition results. The table 400 is an example of transformations as described in more detail herein. In one example, the transformations are performed based on words and not entire sentences. In addition, the table 400 is representative of error corrections made in the past by the particular user. And, using one or more models described herein, personalized contextual information (from a plurality of data sources) is used in second-pass processing to correct future recognition errors for the user (e.g., sources in addition to the correction log).

It should be noted that a single recognition event covers the activities from the initial voice input until the task is successfully completed or abandoned in some examples. The recognition event data may be reported by the speech-enabled application and/or another application involved in the exchange (e.g., the real-time speech recognition system). The recognition event data is transmitted to and stored in a recognition event store in some examples (e.g., within the storage 104). The recognition event data collected during the transaction can include any type of information and is not limited to the entries shown in the table 400. For example, recognition event data can include, but is not limited to, the user's initial voice input, subsequent user inputs, and any action or selection by the user after receiving the response to the user input selection, and the audio data passed to the real-time speech recognition system. The recognition event data may be annotated with supplemental information including, but not limited to, time stamps and source identifiers allowing the information to be correlated and the event sequence to be reconstructed.

Figure 5:
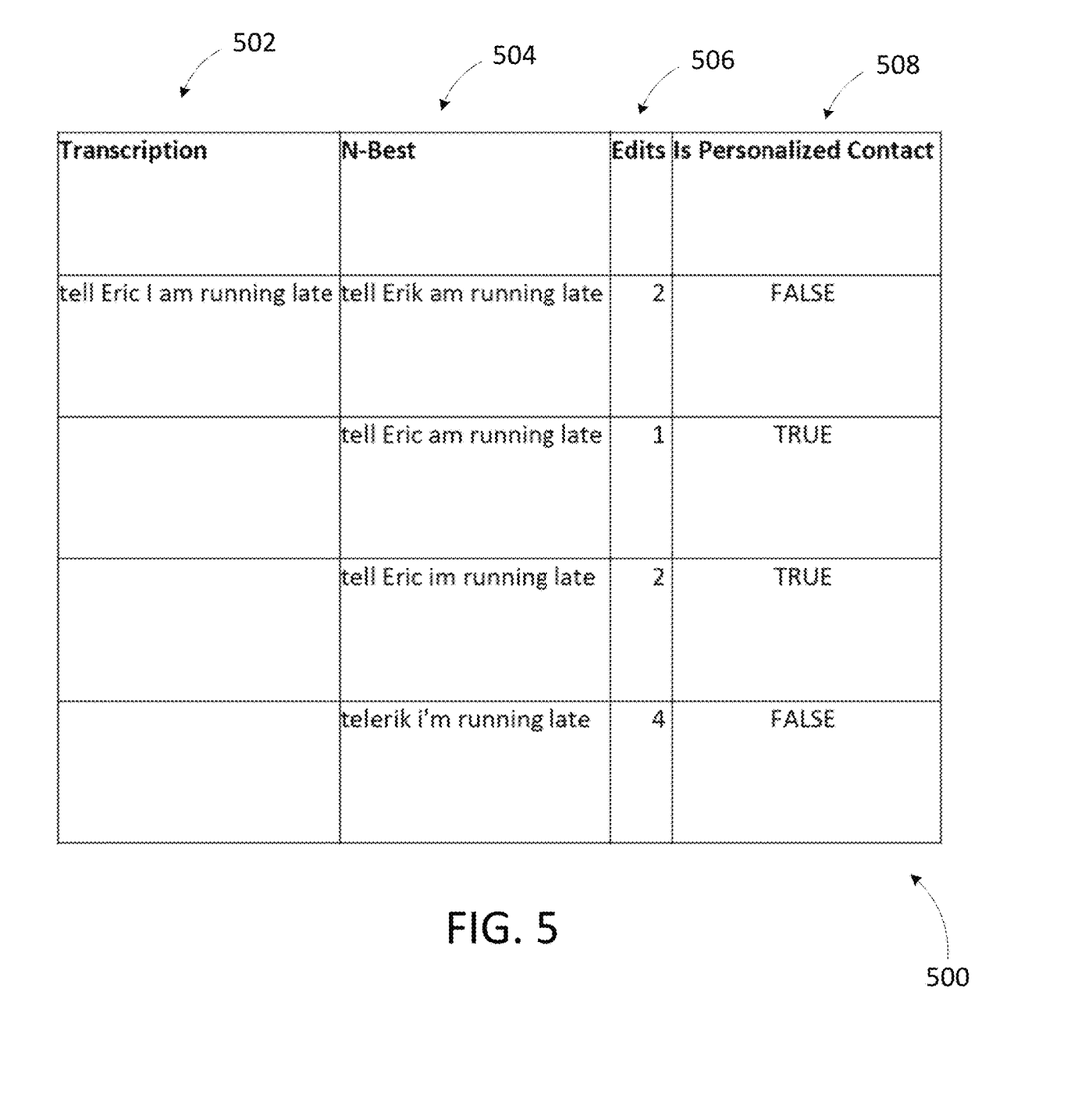
FIG. 5 is a table illustrating personal class definitions used for error correction according to an example.

Other types of contextual information corresponding to the user also can be used in various examples in the second-pass processing 210. For example, a plurality of personal class definitions as illustrated in FIG. 5 can be used in the second-pass processing 210. For example, FIG. 5 illustrates a table 500 used in by various examples of error correction techniques described herein to correct recognition errors. The table 500 corresponds to personal class definitions specific to the individual user. That is, the table 500 includes other personal information for the user that is used in combination with the error correction logs illustrated in the table 400. In one example, the user correction logs together with the additional personal information using personal class definitions, provide a record of speech recognition events and subsequent user behavior that implicitly confirms or rejects the recognition result and/or shows the user's intended spoken words via subsequent actions in various examples. The table 500 illustrates additional personal information used in various examples of error correction. In one example, personal names or entities are used to re-rank recognition candidates. As can be seen, in the illustrated example, the table 500 logs the transcription 502 from the first-pass processing 306, the candidates 504 organized in an N-best list, a number of edits 506 performed on the transcription 502, and whether the transcription 502 includes a personalized contact 508 (e.g., true for personalized contacts from a contact list of the user and false for non-personalized contacts).

The personal class definitions can include any type of class definitions specific to the individual. For example, and without limitation, personal class definitions can include at least personal contact information comprising personal entities of the individual user, custom folders in an email program, slide deck names, media and metadata of the individual user, and a user generated schema related to folder collections or media collections, among other information.

Other types of contextual information corresponding to the user also can be used in various examples in the second-pass processing 210. That is, the contextual information is not limited to error correction logs or personal class definitions. In some examples, the information and definitions can come from the application or situational context. For example, business and personal contact lists can have different priorities depending on the application. In one example, interfacing with a business application (e.g., Microsoft® Teams) or a personal application (e.g., Messenger) can result in entities (e.g., candidates 504) from the corresponding contact lists being given different priorities or weights in the N-best list.

In one example, and with reference again to FIG. 2, the speech recognition correction processor 202 analyzes the correction logs and other personalized information to distill the information down to a set of transformations that corrects the recognition error in future attempts. That is, the error correction model 208 is personalized since the error correction model 208 is built using the personalized contextual information corresponding to the individual user, such as the user's correction log and personal class definitions. In various examples, the personalized contextual information is used in training a neural network with a plurality or training sets using neural network training techniques. In some examples, the error correction model 208 is a dynamic model that defines a transformer that has improved error correction (e.g., a neural network based translational model). In one example, re-ranking objective functions is used with discriminative training in addition or in place of the second-pass restoring.

In one example, the error correction model 208 is configured to or operates to:
1. Use historical correction logs showing user corrected voice queries with corresponding text queries;
2. Make suggestions for a query the next time a voice recognition query is captured, such as before running the query;
3. Use user's contact list to correct spelling (names);
4. Builds a ranker that re-ranks and N-best list of results presented to the user;
5. Uses contextual information that can also be obtained from application context (e.g., business or personal context);
6. Uses personal class definitions (e.g., contacts, situational context); and
7. Regardless of the data source, the ranker analyzes in correction logs, personal class definitions, and uses that information to re-rank recognition results and add new entries (compared to first-pass results).

Thus, in addition to the N-best list generated using speech recognition, the error correction model adds new entries in the N-best list (generated outside of first-pass recognition and created based on user correction logs and other personalized contextual information) based on personalized error correction. It should be noted that in various examples, in all cases where the trained error correction model is used, the model adds a new alternative result or can also return the voice recognition result if the model cannot make a correction, or the model deems the result correct (probabilistically correct).

Thus, the speech recognition correction processor 202 has access to the voice input 204, which is used in performing speech recognition error correction in some examples. It should be appreciated that the speech recognition correction processor 202 is configured to perform speech recognition correction tasks in a wide variety of application domains. For example, examples of the present disclosure provide speech recognition correction for different types of datasets, in addition to the speech datasets described herein.

Also, with respect to the speech recognition correction processor 202, various parameters, etc. can be specified by an operator. For example, the operator is able to specify weighting values of different inputs, specific contextual information to analyze, etc. using a graphical user interface 216. For example, once the operator has configured one or more parameters, the speech recognition correction processor 202 is configured to perform speech recognition correction as described herein. It should be noted that in some examples, once the training of one or more neural networks is complete (for example, after the training data is exhausted) a trained speech recognition error corrector 218 is stored and loaded to one or more end user devices, such as the smart phone 208, the wearable augmented reality computing device 212, the laptop computer 210 or other end user computing device. The end user computing device is able to use the trained speech recognition error corrector 218 to carry out one or more error correction tasks, such as for speech recognition error correction.

Figure 6:
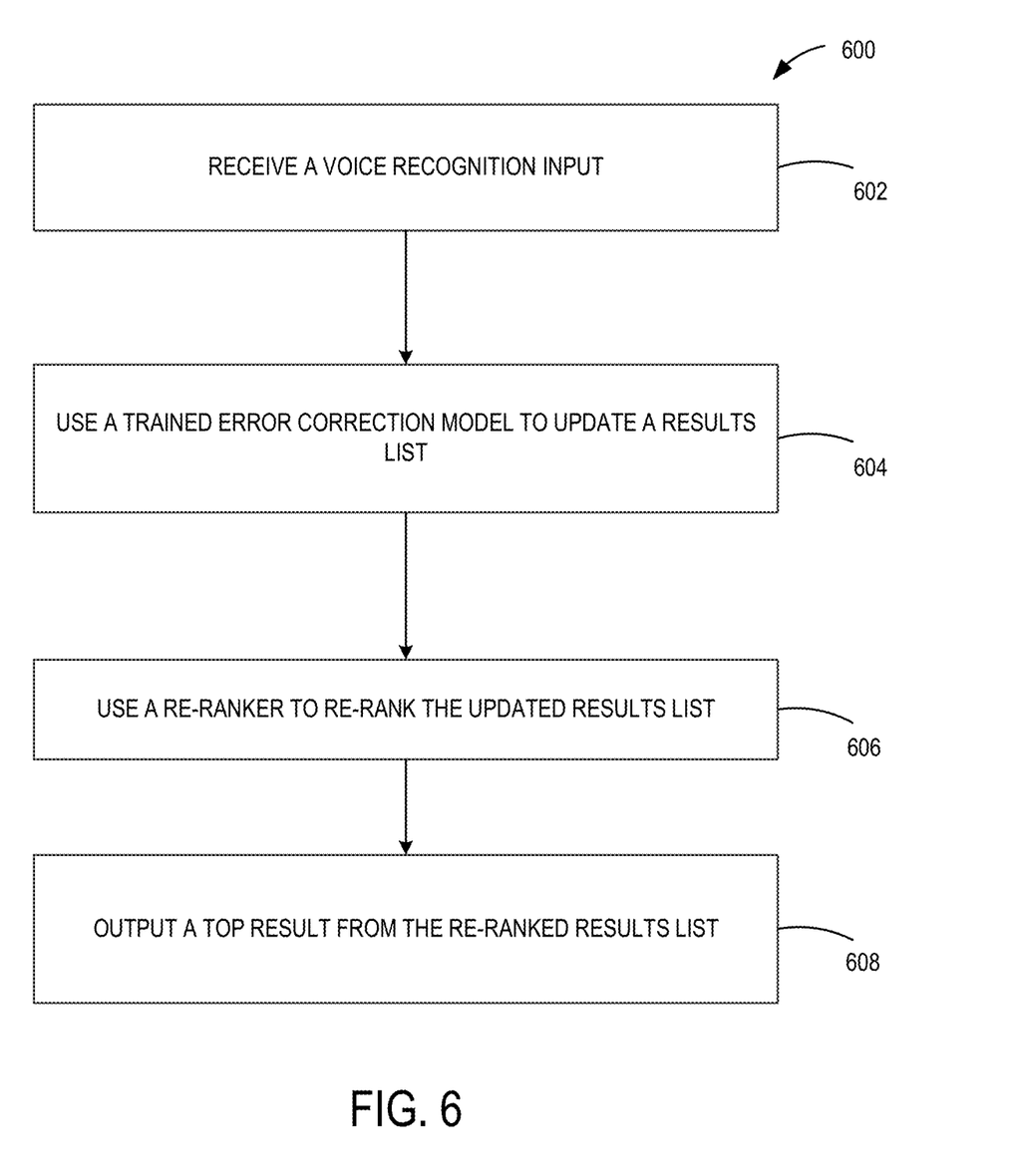
FIG. 6 is a flow chart illustrating operations of a computing device to perform speech recognition correction according to an example.

As should be appreciated, the various examples can be used in the operation of different types of neural networks and for different types of speech recognition. Additionally, the various examples can be used to perform speech recognition error correction with different types of data. FIG. 6 illustrates a flow chart of a method 600 for performing speech recognition correction of various examples. The operations illustrated in the flow chart described herein can be performed in a different order than is shown, can include additional or fewer steps, and can be modified as desired or needed. Additionally, one or more operations can be performed simultaneously, concurrently, or sequentially. The method 600 is performed in some examples on computing devices, such as a server or computer having processing capabilities to efficiently perform the operations, such as a graphics processing unit (GPU).

With reference to the method 600, a computing device receives a voice recognition input from an individual user at 602. For example, a spoken input (e.g., user spoken query) from a user is received at a microphone or other voice input device. The spoken input is processed in a first-pass by a voice recognition system using one or more speech recognition techniques to generate a results list of candidates (e.g., possible option) corresponding to text translations of the voice input and that define the voice recognition input. In one example, as described herein, the received voice input processed by the voice recognition system generates a first-pass recognition lattice, and the results list is derived from the first-pass recognition lattice and ordered by acoustic and language model scores.

A trained error correction model (e.g., a dynamic speech detection correction model corresponding to only the individual user) is used at 604 to add a new alternative result to the results list based on the received voice input processed by the voice recognition system. The error correction model in some examples is trained using contextual information corresponding to an individual user as described in more detail herein. For example, the contextual information includes a plurality of historical user correction logs, a plurality of personal class definitions, and an application context in some examples. In one example, at least one new path is then introduced in the first-pass recognition lattice to generate an updated recognition lattice used to generate the updated results list.

A re-ranker is used to re-rank the results list with the new alternative result at 606. For example, a new N-best list of candidate text translations is generated that has a different ranking order than the N-best list generated by the voice recognition system. The new alternative result is also ranked in the N-best list (e.g., an updated N-best results list is generated using the updated recognition lattice and based on a plurality of personalized error corrections). In one example, the re-ranker uses a re-ranking algorithm that processes the results of the first-pass recognition lattice and at least one second-pass feature related to the plurality of historical user correction logs and the plurality of personal class definitions to re-order the N-best results list in a second-pass scoring process (e.g., interfacing with at least one of a business application or a personal application to change at least one of a weight or a priority of an entity within personal contact information).

A top result from the re-ranked results list is then output at 708. For example, the highest ranked candidate for the translation text (e.g., text translated or converted spoken user query) is output. It should be noted that the highest rank candidate in various examples is from the original N-best list or from the new candidate introduced by the error correction system (e.g., the translation text). In some examples, a plurality of top results is output and displayed to the individual user (e.g., on a screen of one or more of the end user computing devices shown in FIG. 1). In one example, the voice recognition input comprises a user query and the plurality of top results comprises a plurality of top candidate search queries. The plurality of top candidate search queries is used in some examples in a subsequent processing stage to perform an online search.

Thus, in some examples, the method 600 can be used to perform personalized speech recognition error correction. For example, the method 600 uses (1) user correction logs, (2) personal information, and (3) other contextual information (e.g., application being used during correction) to improve speech recognition. The method 600 analyzes the correction logs and distills the logs down to a set of transformations that corrects the recognition error in future attempts in an error correction model and using other contextual information as described in more detail herein.

Exemplary Operating Environment

Figure 7:
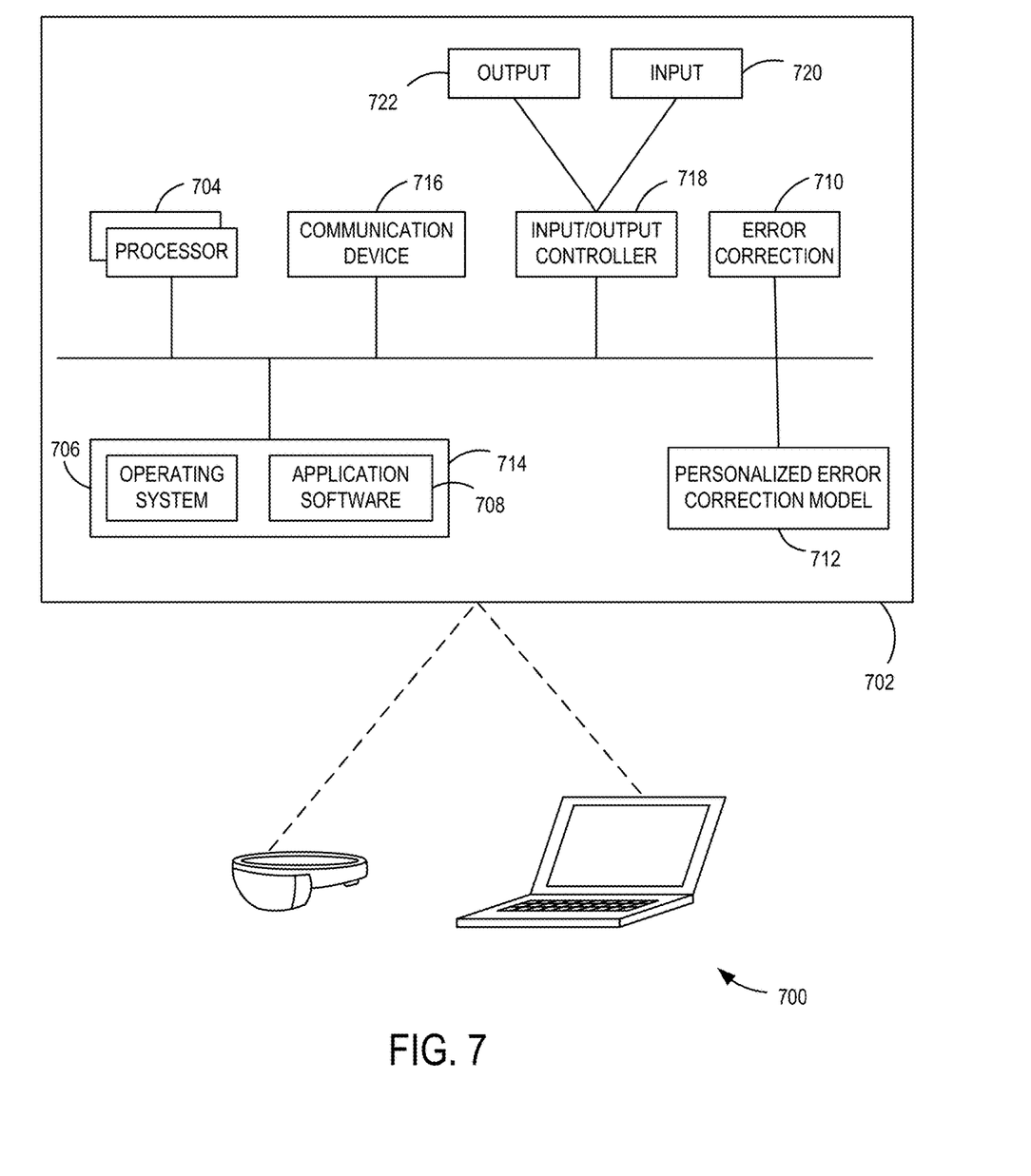
FIG. 7 illustrates a computing apparatus according to example as a functional block diagram.

The present disclosure is operable with a computing apparatus 702 according to an example as a functional block diagram 700 in FIG. 7. In one example, components of the computing apparatus 702 may be implemented as a part of an electronic device according to one or more examples described in this specification. The computing apparatus 702 comprises one or more processors 704 which may be microprocessors, controllers, or any other suitable type of processors for processing computer executable instructions to control the operation of the electronic device. Platform software comprising an operating system 706 or any other suitable platform software may be provided on the apparatus 702 to enable application software 708 to be executed on the device. According to an example, speech recognition error correction 710 using a personalized error correction model 712 can be accomplished by software.

Computer executable instructions may be provided using any computer-readable media that are accessible by the computing apparatus 702. Computer-readable media may include, for example, computer storage media such as a memory 714 and communications media. Computer storage media, such as the memory 714, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 714) is shown within the computing apparatus 702, it will be appreciated by a person skilled in the art, that the storage may be distributed or located remotely and accessed via a network or other communication link (e.g., using a communication interface 716).

The computing apparatus 702 may comprise an input/output controller 718 configured to output information to one or more input devices 720 and output devices 722, for example a display or a speaker, which may be separate from or integral to the electronic device. The input/output controller 718 may also be configured to receive and process an input from the one or more input devices 720, for example, a keyboard, a microphone, or a touchpad. In one embodiment, the output device 722 may also act as the input device 720. An example of such a device may be a touch sensitive display. The input/output controller 718 may also output data to devices other than the output device 722, e.g., a locally connected printing device. In some embodiments, a user may provide input to the input device(s) 720 and/or receive output from the output device(s) 722.

In some examples, the computing apparatus 702 detects voice input, user gestures or other user actions and provides a natural user interface (NUI). This user input may be used to author electronic ink, view content, select ink controls, play videos with electronic ink overlays and for other purposes. The input/output controller 718 outputs data to devices other than a display device in some examples, e.g., a locally connected printing device.

The functionality described herein can be performed, at least in part, by one or more hardware logic components. According to an embodiment, the computing apparatus 802 is configured by the program code when executed by the processor(s) 704 to execute the examples and implementation of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A computerized method for speech recognition correction, the computerized method comprising:
  receiving a voice recognition input from an individual user;
  using a trained error correction model to add a new alternative result to a results list based on the received voice input processed by a voice recognition system, the error correction model trained using contextual information corresponding to the individual user, the contextual information comprising a plurality of historical user correction logs, a plurality of personal class definitions, and an application context;
  using a re-ranker to re-rank the results list with the new alternative result; and
  outputting a top result from the re-ranked results list.

Other examples include:

A system for speech recognition correction, the system comprising:
  at least one processor; and
  at least one memory comprising computer program code, the at least one memory and the computer program code configured to, with the at least one processor, cause the at least one processor to:
    receive a voice recognition input from an individual user;
    use a trained error correction model to add a new alternative result to a results list based on the received voice input processed by a voice recognition system, the error correction model trained using contextual information corresponding to the individual user, the contextual information comprising a plurality of historical user correction logs, a plurality of personal class definitions, and an application context;

use a re-ranker to re-rank the results list with the new alternative result; and output a top result from the re-ranked results list.

Other examples include:

One or more computer storage media having computer-executable instructions for speech recognition correction that, upon execution by a processor, cause the processor to at least:

receive a training set of voice inputs corresponding to the individual user;

train an error correction model using the training set and contextual information corresponding to the individual user, the contextual information comprising a plurality of historical user correction logs, a plurality of personal class definitions, and an application context;

use the trained error correction model to add a new alternative result to a results list based on the received voice input processed by a voice recognition system;

use a re-ranker to re-rank the results list with the new alternative result; and output a top result from the re-ranked results list.

Alternatively, or in addition to the examples described above, examples include any combination of the following:

wherein the received voice input processed by the voice recognition system generates a first-pass recognition lattice, and the results list is derived from the first-pass recognition lattice and ordered by acoustic and language model scores, and further comprising introducing at least one new path in the first-pass recognition lattice to generate an updated recognition lattice.

wherein the results list comprises an N-best results list, and further comprising generating an updated N-best results list based on the updated recognition lattice and a plurality of personalized error corrections.

wherein the re-ranker uses a re-ranking algorithm that processes the results list from a first-pass and at least one second-pass feature related to the plurality of historical user correction logs and the plurality of personal class definitions to re-order the N-best results list in a second-pass scoring process.

further comprising outputting a plurality of top results and displaying the plurality of top results to the individual user.

wherein the voice recognition input comprises a user query and the plurality of top results comprises a plurality of top candidate search queries, and further comprising using the plurality of top candidate search queries in a subsequent processing stage to perform an online search.

wherein the plurality of personal class definitions comprises at least personal contact information comprising personal entities of the individual user, custom folders in an email program, slide deck names, media and metadata of the individual user, and a user generated schema related to folder collections or media collections.

further comprising interfacing with at least one of a business application or a personal application to change at least one of a weight or a priority of an entity within the personal contact information.

wherein the error correction model comprises a dynamic speech detection correction model corresponding to only the individual user.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for training a neural network. The illustrated one or more processors 1004 together with the computer program code stored in memory 1014 constitute exemplary processing means for fusing multimodal data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for speech recognition correction, the computerized method comprising:
   receiving a voice recognition input from an individual user, wherein the voice recognition input comprises speech processed by a voice recognition system to generate a results list during a first-pass speech recognition process;
   using an error correction model to add a new alternative result to the results list during a second-pass error correction process based on the voice recognition input processed by the voice recognition system, the error correction model trained using contextual information corresponding to the individual user, the contextual information comprising a plurality of historical user correction logs, a plurality of personal class definitions including a personal contacts list of the individual user and a business contacts list of the individual user, and an application context, wherein the business contacts list of the individual user is derived from a business application used by the individual user, and wherein using the error correction model to add the new alternative result includes adding a contact name from the personal contacts list of the individual user as the new alternative result;
   using a re-ranker to re-rank the results list with the new alternative result, wherein the new alternative result is assigned a higher priority when the contact name is included in the business contacts list of the individual user; and
   outputting a top result from the re-ranked results list.

2. The computerized method of claim 1, wherein the voice recognition input processed by the voice recognition system generates a first-pass recognition lattice, and the results list is derived from the first-pass recognition lattice and ordered by acoustic and language model scores, and the computerized method further comprising introducing at least one new path in the first-pass recognition lattice to generate an updated recognition lattice.

3. The computerized method of claim 2, wherein the results list comprises an N-best results list, and the computerized method further comprising generating an updated N-best results list based on the updated recognition lattice and a plurality of personalized error corrections.

4. The computerized method of claim 3, wherein the re-ranker uses a re-ranking algorithm that processes the results list from a first-pass and at least one second-pass feature related to the plurality of historical user correction logs and the plurality of personal class definitions to re-order the N-best results list in a second-pass scoring process.

5. The computerized method of claim 1, further comprising outputting a plurality of top results and displaying the plurality of top results to the individual user.

6. The computerized method of claim 5, wherein the voice recognition input comprises a user query and the plurality of top results comprises a plurality of top candidate search queries, and the computerized method further comprising using the plurality of top candidate search queries in a subsequent processing stage to perform an online search.

7. The computerized method of claim 1, wherein the plurality of personal class definitions comprises at least personal contact information comprising personal entities of the individual user, custom folders in an email program, slide deck names, media and metadata of the individual user, and a user generated schema related to folder collections or media collections.

8. The computerized method of claim 7, further comprising interfacing with at least one of a business application or a personal application to change at least one of a weight or a priority of an entity within the personal contact information.

9. The computerized method of claim 1, wherein the error correction model comprises a dynamic speech detection correction model corresponding to only the individual user.

10. The computerized method of claim 1, wherein using the historical user correction logs to train the error correction model personalizes the error correction model to the individual user.

11. The computerized method of claim 1, wherein the error correction model is trained based on a combination of contextual information corresponding to the plurality of historical user correction logs, the plurality of personal class definitions, and the application context.

12. A system for speech recognition correction, the system comprising:
at least one processor; and
at least one memory comprising computer program code, the at least one memory and the computer program code configured to, with the at least one processor, cause the at least one processor to:
receive a voice recognition input from an individual user, wherein the voice recognition input comprises speech processed by a voice recognition system to generate a results list during a first-pass speech recognition process;
use an error correction model to add a new alternative result to the results list during a second-pass error correction process based on the voice recognition input processed by the voice recognition system, the error correction model trained using contextual information corresponding to the individual user, the contextual information comprising a plurality of historical user correction logs, a plurality of personal class definitions including a personal contacts list of the individual user and a business contacts list of the individual user, and an application context,, wherein the business contacts list of the individual user is derived from a business application used by the individual user, and wherein using the error correction model to add the new alternative result includes adding a contact name from the personal contacts list of the individual user as the new alternative result;
use a re-ranker to re-rank the results list with the new alternative result, wherein the new alternative result is assigned a higher priority when the contact name is included in the business contacts list of the individual user; and
output a top result from the re-ranked results list.

13. The system of claim 12, wherein the voice recognition input processed by the voice recognition system generates a first-pass recognition lattice, and the results list is derived from the first-pass recognition lattice and ordered by acoustic and language model scores, and further comprising introducing at least one new path in the first-pass recognition lattice to generate an updated recognition lattice.

14. The system of claim 13, wherein the results list comprises an N-best results list, and further comprising generating an updated N-best results list based on the updated recognition lattice and a plurality of personalized error corrections.

15. The system of claim 14, wherein the re-ranker uses a re-ranking algorithm that processes the results list from a first-pass and at least one second-pass feature related to the plurality of historical user correction logs and the plurality of personal class definitions to re-order the N-best results list in a second-pass scoring process.

16. The system of claim 12, wherein the at least one memory and the computer program code are configured to, with the at least one processor, cause the at least one processor to output a plurality of top results and displaying the plurality of top results to the individual user.

17. The system of claim 16, wherein the voice recognition input comprises a user query and the plurality of top results comprises a plurality of top candidate search queries, and the at least one memory and the computer program code configured to, with the at least one processor, further cause the at least one processor to use the plurality of top candidate search queries in a subsequent processing stage to perform an online search.

18. The system of claim 12, wherein the plurality of personal class definitions comprises at least personal contact information comprising personal entities of the individual user, custom folders in an email program, slide deck names, media and metadata of the individual user, and a user generated schema related to folder collections or media collections.

19. The system of claim 18, further comprising interfacing with at least one of a business application or a personal application to change at least one of a weight or a priority of an entity within the personal contact information.

20. One or more computer storage media having computer-executable instructions for speech recognition correction that, upon execution by a processor, cause the processor to at least:
receiving a voice recognition input from an individual user, wherein the voice recognition input comprises speech processed by a voice recognition system to generate a results list during a first-pass speech recognition process;
using an error correction model to add a new alternative result to the results list during a second-pass error correction process based on the voice recognition input processed by the voice recognition system, the error correction model trained using a personal contacts list of the individual user and a business contacts list of the individual user, the business contacts list of the individual user derived from a business application used by the individual user, wherein using the error correction model to add the new alternative result includes adding a contact name from the personal contacts list of the individual user as the new alternative result;
using a re-ranker to re-rank the results list with the new alternative result, wherein the new alternative result is assigned a higher priority when the contact name is included in the business contacts list of the individual user; and
outputting a top result from the re-ranked results list.

* * * * *